(12) United States Patent
Ottolini (10) Patent No.: US 10,164,437 B2
(45) Date of Patent: Dec. 25, 2018

(54) MODULE FOR STORING/DRAWING ELECTRICITY IN/FROM AN ELECTRIC ACCUMULATOR APPLICABLE TO PHOTOVOLTAIC SYSTEMS, A PHOTOVOLTAIC SYSTEM AND A METHOD OF UPGRADING A PHOTOVOLTAIC SYSTEM

(71) Applicant: Dario Ottolini, La Spezia (IT)

(72) Inventor: Dario Ottolini, La Spezia (IT)

( * ) Notice: Subject to any disclaimer, the term of this patent is extended or adjusted under 35 U.S.C. 154(b) by 336 days.

(21) Appl. No.: 14/785,833

(22) PCT Filed: Apr. 23, 2014

(86) PCT No.: PCT/IB2014/060939
§ 371 (c)(1),
(2) Date: Oct. 20, 2015

(87) PCT Pub. No.: WO2014/174460
PCT Pub. Date: Oct. 30, 2014

(65) Prior Publication Data
US 2016/0087444 A1    Mar. 24, 2016

(30) Foreign Application Priority Data

Apr. 23, 2013  (IT) ............................... SP2013A0001
Oct. 1, 2013   (IT) ............................... CO2013A0042

(51) Int. Cl.
*H02J 1/10*      (2006.01)
*H02J 3/06*      (2006.01)
(Continued)

(52) U.S. Cl.
CPC .............. *H02J 3/383* (2013.01); *H02J 3/385* (2013.01); *H02J 3/40* (2013.01); *H02J 7/35* (2013.01);
(Continued)

(58) Field of Classification Search
CPC .... H02J 3/383; H02J 3/385; H02J 3/40; H02J 7/35; H02J 3/32; Y02E 10/566; Y02E 10/58
(Continued)

(56) References Cited

U.S. PATENT DOCUMENTS

| | | | |
|---|---|---|---|
| 2011/0140536 A1* | 6/2011 | Adest | H02J 1/12 307/82 |
| 2011/0148360 A1 | 6/2011 | Lee | |
| 2011/0254372 A1* | 10/2011 | Haines | H02J 9/062 307/66 |

FOREIGN PATENT DOCUMENTS

| WO | 2008138016 | 11/2008 |
|---|---|---|
| WO | 2009155445 | 12/2009 |

* cited by examiner

*Primary Examiner* — Carlos Amaya
(74) *Attorney, Agent, or Firm* — Brannen Law Office, LLC (57) ABSTRACT

The module according to the present invention is used for accumulating/drawing electricity in/from an electric accumulator (502); the module comprises first terminals and second terminals; the first terminals are adapted to be connected to a photovoltaic panel (501) and to an inverter (504), and the second terminals are adapted to be connected to the electric accumulator (502); the module comprises a conversion unit (503) adapted to be connected between the first terminals and the second terminals; the conversion unit (503) comprises, in turn, a two-way DC/DC converter (550) adapted to convert a first energy flow generated by the photovoltaic panel (401, 501) to store it in the accumulator (502) and a second energy flow drawn from the accumulator (502) to supply it to the inverter (504), the two-way DC/DC converter (450, 550) is configured to convert said first energy flow and said second energy flow in a selective manner. The module is characterized in that comprises:

(Continued)

power detector means (507) adapted to be connected between a user arrangement (520), which comprises the inverter (504), in particular of the type with MPPT, and a user (506), and a public electric grid (508), and adapted to detect the power flowing between the user arrangement (520) and the public electric grid (508) and vice versa between the public electric grid (508) and the user arrangement (520); the conversion unit (403, 503) comprises a control unit (501) connected to the power detector means (507) and adapted to control the two-way DC/DC converter (550) as a function of signals generated by the power detector means (507). By means of such a module, it is possible to upgrade a photovoltaic system so as to minimize the electricity exchanges between the photovoltaic system and the public electric grid.

20 Claims, 8 Drawing Sheets

(51) Int. Cl.
 *H02J 3/46* (2006.01)
 *H02J 3/38* (2006.01)
 *H02J 7/35* (2006.01)
 *H02J 3/40* (2006.01)
 *H02J 3/32* (2006.01)

(52) U.S. Cl.
 CPC ............... *H02J 3/32* (2013.01); *Y02E 10/566* (2013.01); *Y02E 10/58* (2013.01)

(58) Field of Classification Search
 USPC .......................................................... 307/20
 See application file for complete search history.

MODULE FOR STORING/DRAWING ELECTRICITY IN/FROM AN ELECTRIC ACCUMULATOR APPLICABLE TO PHOTOVOLTAIC SYSTEMS, A PHOTOVOLTAIC SYSTEM AND A METHOD OF UPGRADING A PHOTOVOLTAIC SYSTEM

FIELD OF THE INVENTION

The present invention relates to photovoltaic systems. In particular, it relates to photovoltaic systems for storing/drawing electricity in/from an accumulator.

PRIOR ART

Ever increasing energy needs require new forms of procurement, and to this end the most recent technological developments are focused on exploiting renewable resources naturally available to the best. With regards to the generation of electricity from natural sources, photovoltaic systems have been available for several years, allowing to transform solar energy into electricity.

Figure 1:
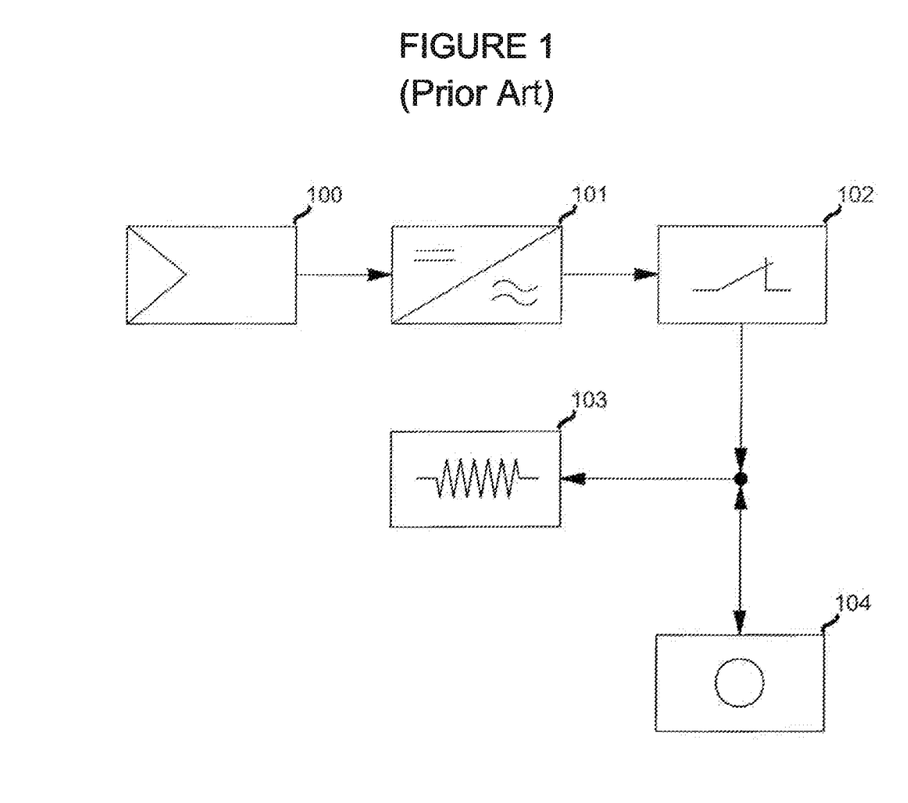
FIG. 1 shows a block diagram of a first known solution of a photovoltaic system.

In general, as diagrammatically shown in FIG. 1, a photovoltaic system comprises at least one photovoltaic panel 100 exposed to solar radiation to receive solar energy and generate direct current electricity from solar energy. A network inverter 101, which converts the direct current generated by the solar panel 100 into alternating current, is connected to the output of the solar panel 100. The output of the inverter 101 is connected to a grid interface device 102, to which both a private local electric user 103 (typically domestic, and typically constituted by a set of loads connected in a network to each other) and a public electric grid 104 are connected electrically in parallel. Thus, the electricity generated by the photovoltaic panel 100, converted into alternating current by the inverter 101 is supplied by means of the grid interface 102 to the grid 104 and to the user 103. The grid interface 102 is needed for electrical safety reasons. Such an interface is a safety switch at the output of the inverter 101: in correct operating conditions, such a switch is normally closed and the generated electricity may thus flow. If instead, the electrical conditions of the grid 104 are beyond the predetermined standard parameter range (typically ±10% of 230 V and 50 Hz, these values obviously varying from country to country), the switch opens and the generated electricity is not transferred to the grid.

As mentioned, the user 103 and grid 104 are connected to the grid interface 102 electrically in parallel.

Thus, according to the consumptions of the users 103 and to the amount of electricity generated by the photovoltaic panel 100, such generated energy may be either prevalently used by the users 103, or prevalently transferred to the grid 104, or equally distributed locally by the users 103 and transferred to the grid 104.

These systems have rapidly spread, above all among small private users, i.e. small residential units, such as, for example, small condominiums or single or two family dwellings, or among small production or commercial units, such as, for example, shops or small workshops in which low electricity consumption machinery is used. Indeed, such systems are easy to install and interesting running incentives are offered by public electric grid operators, these being factors which determine the success of such systems.

Renewable energy sources, such as solar energy, ensure a very variable energy autonomy, their efficiency indeed depending on atmospheric and environmental conditions in the installation site. In particular, photovoltaic systems generate a lot of energy in sunny conditions and little energy in very overcast conditions. Very often, it is possible to go from a very sunny weather condition to a very overcast condition very rapidly, sometimes in only a few minutes. Therefore, the system goes from a condition in which it generates a lot of energy to another in which it generates little electricity in a short time. Equally suddenly may conditions go from overcast to sunny with consequent generation inversion: from a little energy to a lot of energy. Thus, a system generates electricity in a very variable manner over the day, i.e. a lot of energy in one interval of time or very little energy in one interval of time, also frequently fluctuating between these two situations.

Furthermore, in the dark, which in winter starts already in the late afternoon, the generated energy is substantially equal to zero.

Thus, the energy generation curve in a photovoltaic system is concentrated only in the sunny hours, which in winter end already in the afternoon, and may have minimum or maximum zones, characteristic of the atmospheric variability to which the system is subjected. On the contrary, the typical consumption curve does not correspond to the energy generation curve.

Figure 3:
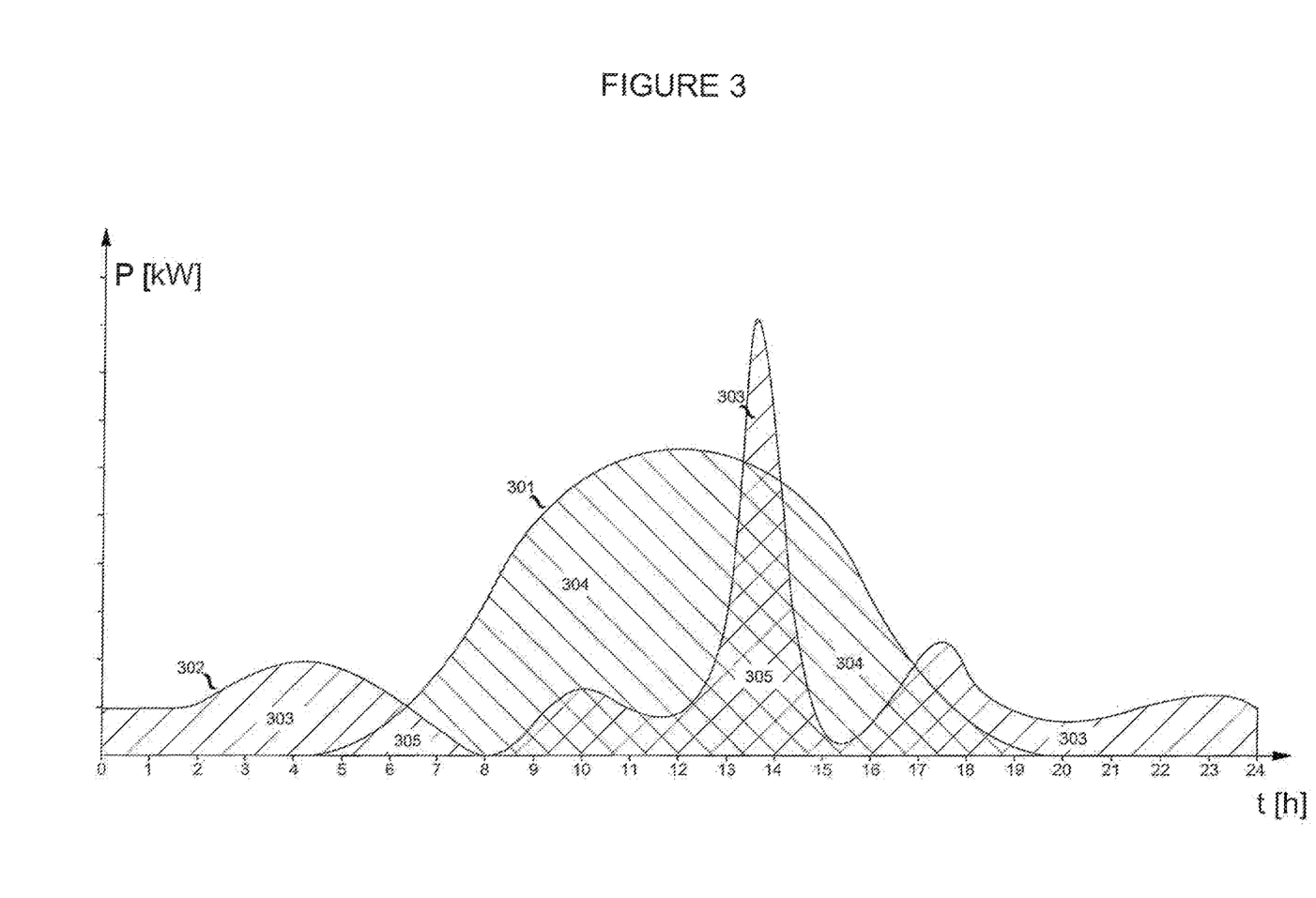
FIG. 3 shows a chart with two superimposed example curves: the electricity generation curve of a photovoltaic system during the hours of a day and the electricity consumption curve of a user during the hours of the same day.

FIG. 3 shows, by way of example, a chart in which the daily generation curve 301 of a photovoltaic panel intended for a given user is superimposed over the daily electrical consumption curve 302 of the same user. As apparent, electricity generation in a photovoltaic system starts in the early hours of the morning, reaches its peak at about noon and then decreases to the minimum about dusk. Such a curve 301, also if referred to an example case, it is rather typical for photovoltaic systems shown in FIG. 1. The consumption curve 302 of the example shown in the figure has some oscillations at different times with a peak about 2 o'clock p.m.

The analysis of the two charts shows some areas subtended by the two charts which indicate corresponding energy conditions. The areas 303 subtended by the consumption curve 302 indicate an energy draw from the electric grid because consumptions occur at a time of the day in which solar energy generation is either zero or not sufficient to cope with the user's energy request.

The area 304 subtended by the production curve 301 indicates an electricity generation by the photovoltaic system which is not consumed by the user but rather transferred to the grid.

The area 305 subtended by the intersection between the consumption curve 302 and the production curve 301 indicates the electricity generated by the photovoltaic system and consumed locally by the users. The sum of area 304 and of area 305 indicates the overall electricity generation of the photovoltaic system. As apparent, both area 304 (transfer of energy generated by the photovoltaic system to the grid) and area 303 (drawing of energy by users from the electric grid) are considerable. This indicates an imbalance between energy generation by the photovoltaic system, which is often transferred to the grid because it is not required by local users, and the consumptions by local users, which very often draw energy from the public grid because the energy generated at that moment by the photovoltaic system is either not available or sufficient.

Thus, despite being provided with a photovoltaic system, a user core keeps working in close synergy with the public electric grid: it surrenders the electricity which is generated and not consumed immediately to the latter and takes energy from the grid itself when necessary and the photovoltaic system is not generating electricity.

Figure 2A:
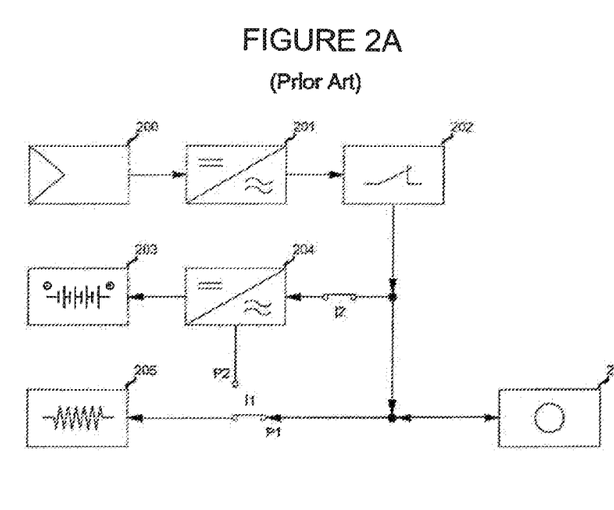
FIG. 2A shows a block diagram of a second known solution of a photovoltaic system, in a first supply operating condition.
Figure 2B:
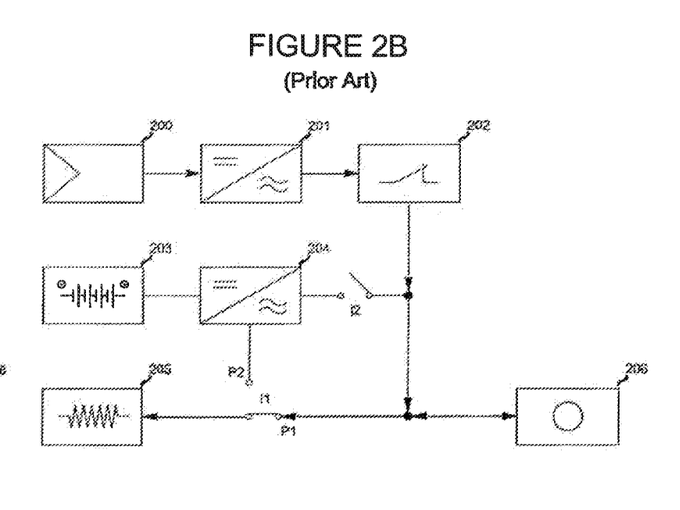
FIG. 2B shows a block diagram of the system in FIG. 2A in a second operating condition.
Figure 2C:
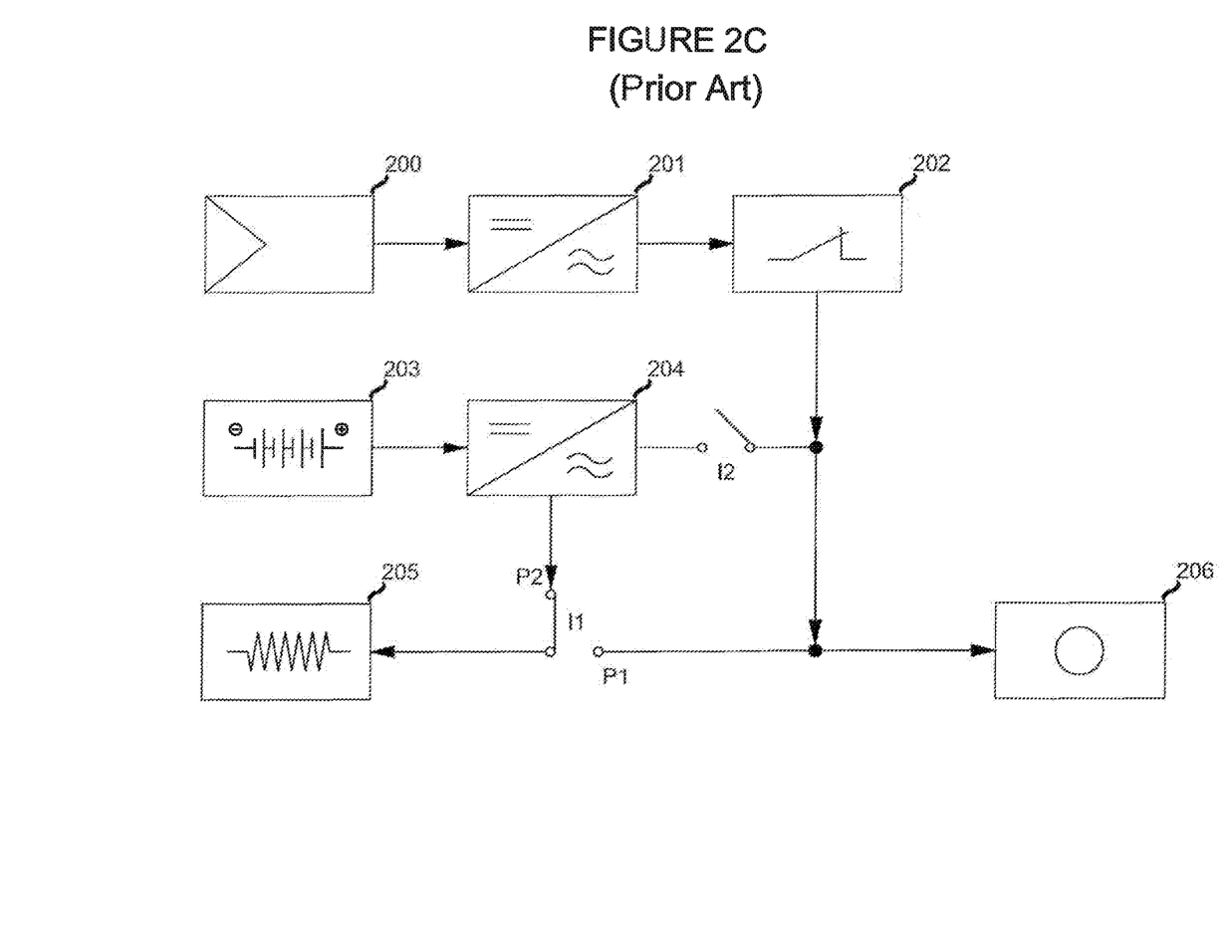
FIG. 2C shows a block diagram illustrating a block diagram of the system in FIG. 2A, in a third operating condition.

In order to overcome these disadvantages, new photovoltaic systems provided with accumulator for storing at least part of the generated energy have been recently developed. FIGS. 2A, 2B and 2C show a block diagram of a known solution of this type in three different opening conditions. The photovoltaic systems of this type comprise a "traditional" photovoltaic system, i.e. one provided with photovoltaic panel 200, network inverter 201, grid interface 202, in which the user 205 and the network 206 are connected electrically in parallel to the interface 202 and a electricity storage and supply part, comprising an accumulator 203 and a two-way inverter 204. The input of the two-way inverter 204 is connected to the grid interface 202 and the output of the inverter 204 is connected to the accumulator 203. Furthermore, two switches I1 and I2 controlled by a control logic (not shown in the figure) are included to connect the user 205 either to the grid 206 and to the "traditional" photovoltaic system, or to the accumulator 203 and to the two-way inverter 204 in a selective manner.

In particular, the switch I2 is arranged in the connection between the grid interface 202 and the two-way inverter and switches from a closed position (like the one shown in FIG. 2A), in which the two-way inverter is electrically connected to the interface 202, to an open position (like the one shown in FIGS. 2B and 2C), in which the two-way inverter 204 is disconnected from the interface 202. The switch I1 selectively connects the electric user to the electric grid 206 and to the interface 202 (FIGS. 2A and 2B) and to the two-way inverter (FIG. 2C). The operative condition during the hours of generation of the photovoltaic system is shown in FIG. 2A or 2B. In FIG. 2A, the energy generated by the photovoltaic panel may be supplied to the inverter 204 to charge the accumulator 203, to the grid 206 and to the user 205. Typically, during the generation hours, the consumptions of the users 205 are very low, thus most of the energy will be conveyed by the inverter 204 to be stored in the accumulator 203. When the accumulator 203 is charged, as in the case in FIG. 2B, the control logic sets switch I2 to the open position, the energy generated by the photovoltaic panel may be supplied to the grid 206 and to the user 205.

During the hours of consumption of the user 205 and in absence of energy production by the photovoltaic panel 200 (typically in the evening), the control logic switches to the operating condition shown in FIG. 2C. The previously stored energy is exploited to supply the user 205. As mentioned, the inverters 204 are two-way devices because they convert the alternating energy exiting from the interface 202 into direct energy to store it in the accumulator 203 and draw direct energy from the accumulator 203 and convert it into alternating energy to supply it to the user 205. Such two-way inverters require certification of conformity to the safety standards currently in force, and in all cases cannot supply energy in parallel to other sources. As shown in FIG. 2C, when the user exploits the stored electricity, the user arrangement 205/two-way inverter 204/accumulator 203 is isolated from all the rest. When the charge in the accumulator 203 ends, the control logic sets the switch I1 from position P2 to position P1, and the user 205 may thus draw electricity from the grid 206.

SUMMARY OF THE INVENTION

The applicant realized that the above-described techniques do not allow to obtain a photovoltaic system which ensures a good degree of independence from the public electric grid to the user core for which it is installed. Furthermore, it is not possible to have photovoltaic systems which store electricity which can be exploited in parallel to the public electric grid.

As mentioned, the most evolved systems allow to store the generated energy in an effective manner to use it when it is most required; however, in the current art, a user may draw energy either from the electric grid or from the accumulator, but these two forms of usage cannot be combined. To this end, the accumulator and the two-way inverter must ensure full autonomy to the user, thus must be appropriately dimensioned to cope with instantaneous energy peaks. Furthermore, the installation of this type of systems is rather complex, the control logic and the switches which are set to provide the two operating conditions must be technologically advanced to ensure a constant supply of electricity also in moments of peak absorption to the user 205. In particular, such switches must be set very rapidly and in perfect synchronicity from one condition to the other.

Furthermore, at least three conversion steps are carried out in such systems: from direct energy generated by the photovoltaic panel to alternating energy output to the first network inverter; from alternating energy exiting from the first network inverter to direct energy exiting from the second inverter to be stored in the accumulator; from direct energy exiting from the accumulator to alternating energy exiting from the second inverter to supply the user. Each conversion step introduces a specific loss due to the conversion efficiency margin, thus the overall losses (i.e. the sum of the losses of each step) may be even considerable. The general efficiency of these solutions is thus rather low.

It is the general object of the present invention to obtain a photovoltaic system which allows to overcome the drawbacks of the prior art in a simple and cost-effective manner.

It is first specific object of the present invention to make the user core equipped with photovoltaic system energetically more independent from the public electric grid.

It is a second object of the present invention to provide a photovoltaic system which allows to supply electricity to a user by exploiting both the stored energy and the energy drawn from the grid.

It is a third object of the present invention to upgrade the already installed photovoltaic systems to make the respective users as independent from the public electric grid as possible.

The inventive idea underlying the present invention relates to a new, original module for accumulating/drawing electricity in/from an electric accumulator applicable to a photovoltaic system to store the electricity generated by the photovoltaic panel and supply it to users in parallel to the grid.

In general, the present invention relates to a module for accumulating/drawing electricity in/from an electric accumulator, such a module comprising first terminals and second terminals, the first terminals being adapted to be connected to a photovoltaic panel and to an inverter, the second terminals being adapted to be connected to the electric accumulator, such a module further comprising a two-way DC/DC converter connected between the first terminals and the second terminals, adapted to convert a first energy flow generated by the photovoltaic panel to store it in the accumulator and a second energy flow drawn from the accumulator to supply it to the inverter, wherein the two-way DC/DC converter is configured to convert the first energy flow and the second energy flow in a selective manner. The module is characterized in that it comprises power detector means adapted to be connected between a user arrangement (which comprises the inverter, in particular of the type with MPPT, and a user), and a public electric grid, and adapted to detect the power flowing between the user arrangement and the public electric grid, and vice versa between the public electric grid and said user arrangement; the conversion unit comprises a control unit connected to the power detector means and adapted to control the two-way DC/DC converter as a function of signals generated by the power detector means. By means of such a module, a photovoltaic system can be upgraded so as to minimize the electricity exchanges between the user arrangement and the public electric grid. Such a module, once connected to the photovoltaic system, is totally transparent for the preexisting system inverter and the preexisting system grid interface, i.e. these two system components continue to work as if the module were not present; in particular, the MPPT (Maximum Power Point Tracker) function of the inverter is not disturbed (or thwarted by the presence of such a module; more specifically, the MPPT function finds the optimal working point (voltage and current) of the photovoltaic modules also corresponding to the maximum power which can be obtained from the photovoltaic panel (in each operating moment) both when part of the power enters into the electric accumulator and part of the power exits from the electric accumulator.

A first further aspect of present invention relates to a photovoltaic system equipped with a module for accumulating/drawing electricity in/from an electric accumulator.

A second further aspect of the present invention relates to a method for updating a photovoltaic system, aimed at equipping it with a module for accumulating/drawing electricity in/from an electric accumulator.

Further, advantageous technical features are set forth in the appended claims.

BRIEF DESCRIPTION OF THE DRAWINGS

The following figures are provided by way of non-limitative example only; furthermore, it is worth noting that they are diagrammatic and show functional blocks adapted to implement the given logic as a function of the inputs and the control signals, and thus can be implemented in practice using various circuit and architectural solutions.

DETAILED DESCRIPTION

The following description and the corresponding drawings are provided only by way of illustrative, non-limiting example of the present invention which can be implemented according to other, different embodiments.

The object of the present invention is conceived to be applied to photovoltaic systems, e.g. installed to supply electricity to residential type users, but not only, thus to new and existing systems.

Figure 4:
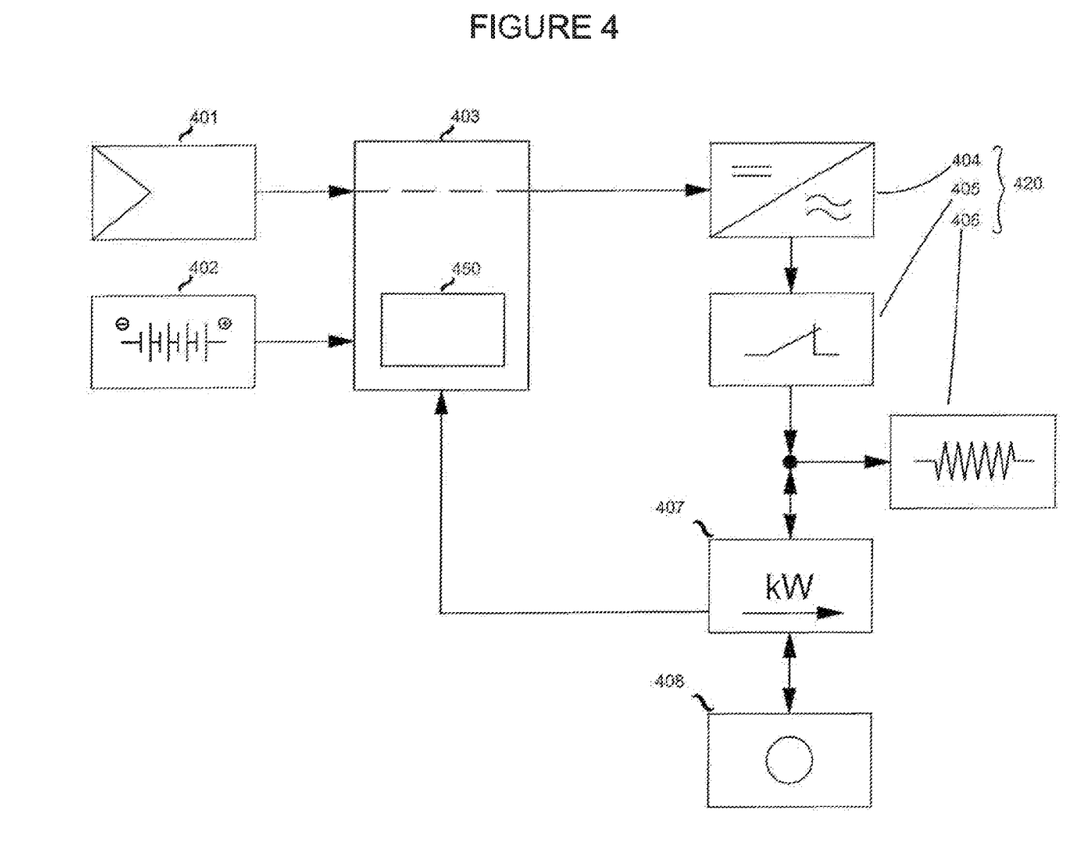
FIG. 4 shows a block diagram of a photovoltaic system equipped with a module according to the present invention.

FIG. 4 shows a first embodiment of a photovoltaic system to which a module for storing and drawing electricity in and from an accumulator 402 is applied. The verbs "store" and "draw" indicate the functions of the module according to the present invention: to store the energy generated by the photovoltaic system, in particular by the photovoltaic panel 401 in the accumulator 402, and to draw energy from the accumulator 402 to supply it to the inverter 404. To this end, the module comprises first terminals adapted to be connected to the photovoltaic panel 401 and to the inverter 404, and second terminals adapted to be connected to the electric accumulator 402. It is worth noting that the first terminals represent the electric connection segment between photovoltaic panel 401/inverter 404 and module according to the present invention, and thus are a single member although they appear as two different portions.

Such a module comprises a conversion unit 403, in turn comprising a two-way DC/DC converter 450 connected between the first terminals and the second terminals, adapted to convert a first energy flow generated by the photovoltaic panel 401 to store it in the accumulator 402, and second energy flow drawn from the accumulator 402 to supply it to the inverter 404. Such a two-way DC/DC converter is configured to convert the first energy flow and second energy flow in a selective manner. Advantageously, it is possible to store the electricity that the photovoltaic panel 401 generates. Furthermore, equally advantageously, electricity can be supplied, when needed, to the users—406 drawing it from the accumulator 402 when the photovoltaic panel 401 does not generate.

It is worth noting that the expression "DC/DC converter" means an electric converter capable of converting a direct energy flow with a given input voltage value into a direct energy flow with a different output voltage value.

Figure 5:
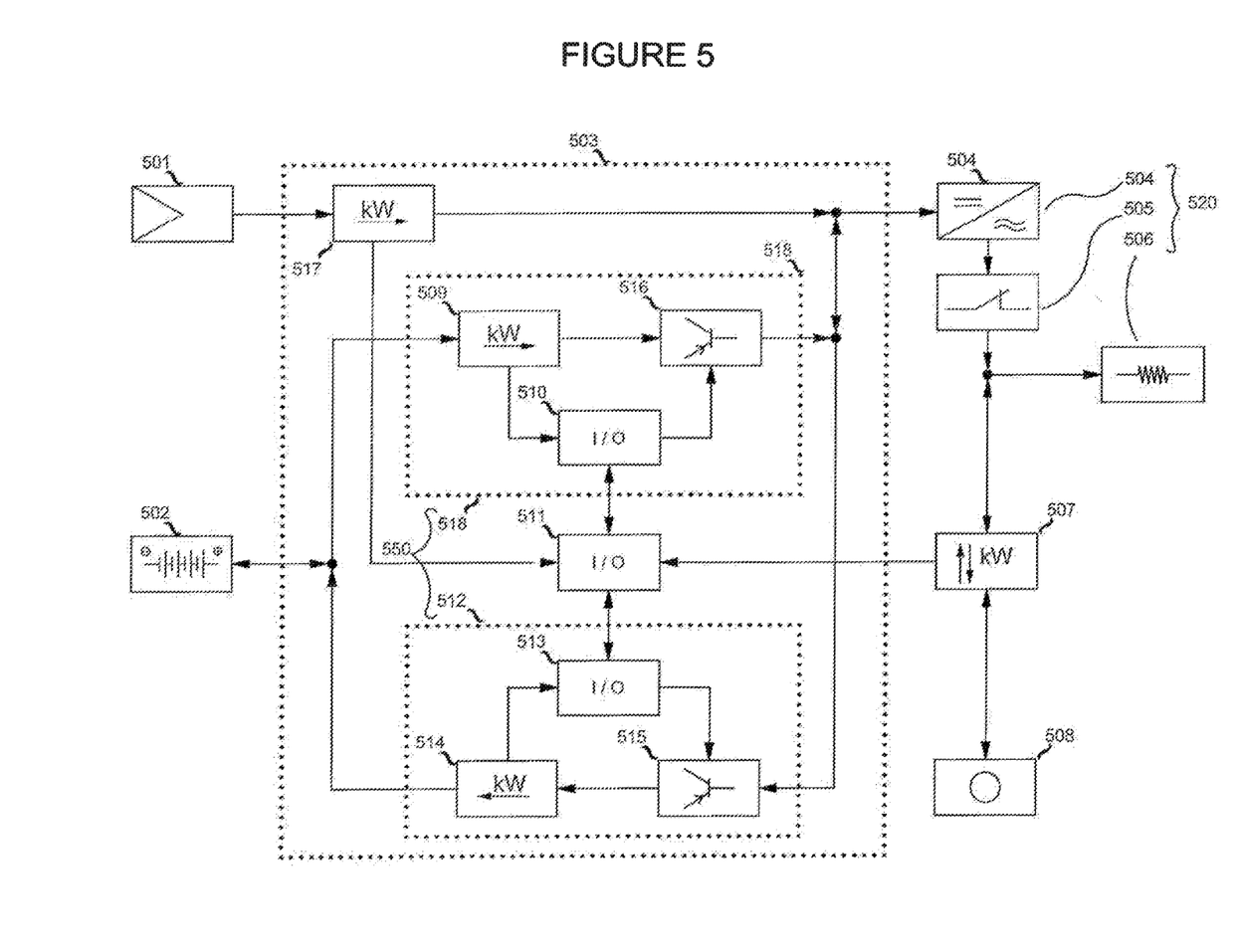
FIG. 5 shows a block diagram of the system in FIG. 4 in greater detail, equipped with a module according to the present invention.

The expression "two-way DC/DC converter" thus means a converter which allows to convert a first flow according to first sense, i.e. from an input to an output, and a second flow according to a second sense, contrary to the first, i.e. from the output to the input. According to the present invention, the first flow is the one which is converted at the output of the photovoltaic panel 401 to be stored in the accumulator 402. The second flow is the one drawn by the accumulator 402 and converted to be supplied to the inverter 404. Typically, the photovoltaic panel 401 generates electricity with voltage between 100 Volt and 600 Volt. The accumulator 402 draws energy at lower voltages, typically between 12 Volt and 48 Volt, or even more if multiple accumulators are used in series. The inlet voltage to the inverter 404 varies each time due to the presence of the Maximum Power Point Tracker (MPPT), a device integrated in the inverter 404 which allows to obtain the maximum power from the photovoltaic panel 401. Typically, the energy voltage at the input of the inverter 404 varies between 190 Volt and 600 Volt. Thus, this are the typical dynamics that a two-way DC/DC converter according to the present invention must manage: from 100-600 V in input to 24-48 V in output for storing the energy generated by the photovoltaic panel 401 in the accumulator 402; and from 24-48 V in input to 190-600 V in output for drawing energy from the accumulator 402 and supplying it to the inverter 404. To this end, as shown in FIG. 5, a two-way DC/DC converter 550 according to the present invention comprises:

- a voltage reducer 512, comprising a reducer input connected to the first terminals, and a reducer output connected to the second terminals. Such a reducer 512 is adapted to reduce the voltage between the reducer input and the reducer output;
- a voltage booster 518, comprising a booster input connected to the second terminals, and booster output connected to the first terminals. Such a booster 518 is adapted to boost the voltage between the booster input and the booster output. Thereby, the energy exiting from the panel 401 is converted into a voltage value suitable for storing it in the accumulator 502 and, in turn, the energy drawn from the accumulator 502 is converted into a voltage value suitable to be supplied in input to the inverter 404.

As mentioned, the reducer 512 and the booster 518 selectively convert a first energy flow (from the panel 501 to the accumulator 502) and a second energy flow (from the accumulator 502 to the inverter 504), respectively. To this end, the storage and drawing module according to the present invention comprises a control unit 511 connected to the reducer 512 and to the voltage booster 518, and configured to control them, as will be described in greater detail below.

The module according to the present invention is intended to be applied on installed or newly commissioned photovoltaic systems. In particular, such a module is conceived for photovoltaic systems known in the field as "grid systems", i.e. systems which supply the electricity generated by the photovoltaic panel 401, 501 by means of the grid inverter 404, 504 to a user 406, 506 and to the public electric grid 408, 508. Indeed, the user 406, 506 and the public electric grid 408, 508 are connected electrically in parallel by means of the grid interface 405, 505 to the output of the inverter 404, 504. According to the configuration of such systems, the inverter 404, 504 may thus supply electricity: totally to the user 406, 506, if consumptions are equal to or higher than the production value of the photovoltaic panel; in part to the user 406, 506 and in part to the grid 408, 508, if the user's consumptions are lower than the generation value of the photovoltaic panel; nearly totally to the grid 404, 504, if the user's consumptions 406, 506 are nearly zero (it is rather rare that the consumptions of a user is actually zero). However, the consumptions of the user 406 may be higher than the generation value of the photovoltaic panel; in this case, the energy required in excess (which may also be all the energy consumed by the user in moments in which the panel is not generating) is drawn by the public grid 408, 508. For the purposes of the present invention, a user arrangement 420, 520 is the whole formed by: inverter 404, 504, grid interface 405, 505 and user 406, 506. A user arrangement 420, 520 may be different from that shown in the figure, e.g. the grid interface 405, 505 may be integrated in the inverter 404, 504 or the user 506 may actually be a plurality of users (e.g. a two-family house).

Substantially, the public grid 408, 508 is conceptually separated from the user arrangement 420, 520 which is upstream of the grid itself to measure the power flowing from the public grid to the user arrangement and, vice versa, the power which is transferred by the user arrangement to the grid. In other words, the power draw conditions of the user 506 to the public grid 508 and of transfer of the power generated by the photovoltaic panel 501 to the grid 508 are thus identified. To this end, the module according to the present invention comprises power detector means 507 connected between the user arrangement 520 and the public grid 508. According to the example of embodiment shown in FIG. 5, the means 507 are connected to the inverter 504 (by means of the grid interface 505), to the output of the user 506 and to the input of the public grid 508. Thereby, it is possible to detect the power flowing between the user arrangement 520 and the public grid 508 (i.e. the condition of transferring power to the grid) or between the public electric grid 508 and the user arrangement 520 (i.e. the condition of drawing power from the grid).

The accumulator 502 also comprises charge sensor means (not shown in the figure) adapted to detect the residual charge value. Such means may be implemented in different manners, e.g. may detect the voltage at the terminals of the accumulator in different operating conditions; i.e. when the booster 518 is active (energy is supplied by drawing it from the accumulator) and the reducer 512 is inactive, and—vice versa—when the reducer 512 is active and the booster 518 is inactive (energy is stored in the accumulator). The detections carried out in these conditions are read by the control unit 511, which is appropriately configured to determine the charge state of the accumulator on the basis of such detections. According to the embodiment shown in FIG. 5, the control unit 511 is connected to the power detector means 507 and to the charge sensor means and is configured to select the voltage reducer 512 and the voltage booster 518 in a selective manner according to the power flowing between the user arrangement 520 and the public electric grid 508 or between the public electric grid 508 and the user arrangement 520 and to the value of residual charge of the accumulator.

The control unit 511 is thus configured:
i—to activate the voltage reducer 512 if the power flowing between the user assembly 520 and the public electric grid 508 is higher than a predetermined value and the residual charge value indicates an availability of the battery 502 to store more power;
ii'—to activate the voltage booster 518 if the power flowing between the public electric grid 508 and the user assembly 520 is higher than a predetermined value and the residual charge value indicates an availability of power which can be supplied by the accumulator 502.

In other words, condition i' occurs when the photovoltaic panel 501 generates electricity and the consumptions of the user 506 are lower than the generation value panel of the panel. In particular, two operating conditions may be identified in this condition:
 the consumptions of the users 506 are close to zero, the generated power is nearly entirely transferred to the grid, or
 the users 506 consume less power than that generated by the panel, thus part of the generated power is drawn by the users, while the remaining part is transferred to the grid.

In all cases, power is transferred to the grid. The means 507 detect such a condition, i.e. detect the power flowing from user arrangement 520 to the grid 508, and supply such a detection to the control unit 511. Furthermore, the control unit 511 checks the stored residual charge value. If it results that the accumulator 502 can be further charged, the unit 511 activates the voltage reducer 512, thus the power generated by the photovoltaic panel 501 which is not consumed locally (i.e. by the user 506) is stored.

Condition ii occurs when the user 506 draws power from the public electric grid 508 and the accumulator 502 has available stored power. Also in this case, the means 507 detect such a condition, in particular detect the power flowing between public electric grid 508 and the user arrangement. Such a detection is supplied to the control unit 511, which also checks the stored residual charge value. If it results that the accumulator 502 has sufficient stored power, the unit 511 activates the booster voltage 518, thus the power stored is supplied to the user 506.

Different cases from those described must be appropriately managed, and a programming logic of the control unit 511 must be implemented to ensure a continual supply of power requested by the user either if this is drawn from the accumulator, or is drawn in part from the accumulator, or is drawn in part from the grid. Such aspects will be more apparent from the following description, in particular with reference to FIG. 6.

As shown again in FIG. 5, according to a preferred embodiment, the reducer 512 comprises:

- a first switching reducer converter 515 comprising a first connection branch connected to the first terminals and a second connection branch connected to the second terminals, and adapted to reduce the voltage between said first branch and the second branch. Such a converter, for example, may be made by means of a buck converter, known in itself;
- a first power sensor 514 connected between the second connection branch and the second terminals and adapted to detect first power values related to the power exiting from the second connection branch;
- a first microcontroller 513 connected to the first reducer converter 515, to the first power sensor 514 and to the control unit 511 and configured to control the first reducer converter 515.

In particular, the first microcontroller 513 is configured to control the duty cycle of the first reducer converter 515 according to: the first power values of the power flowing between the user arrangement 520 and the grid 508 (and vice versa), and by the value of residual charge of the accumulator 502.

According to an example of embodiment, the control unit 511 controls the first converter 515 by means of the first microcontroller 513 to charge the accumulator 502 if the power flowing between the user arrangement 520 and grid 508 is higher than a predetermined value, (e.g. is higher than a threshold set to +50 Watts) and the stored residual charge value indicates that the accumulator 502 may be charged further.

The duty cycle of the first converter 515 represents the fraction of time, on the total considered time, for which the reducer converter 515 active, i.e. the fraction of time during which the switch is closed with respect to the total considered time. For the reducer converter 515, the output voltage (which is reduced) is as a function of the duty cycle. In particular, in the case of a buck converter, the output voltage decreases linearly as the duty cycle decreases. So, by controlling a decrease of the duty cycle of the reducer converter 515, a given output voltage reduced with respect to the input voltage is obtained. To this end, the first microcontroller 513 is connected to the first converter 515 to control its duty cycle. Again with reference to FIG. 5, according to a preferred embodiment, the booster 518 comprises:

- a second switching DC/DC booster converter 516 comprising a first connection branch connected to the second terminals, and a second connection branch connected to the first terminals, and adapted to boost the voltage between the first branch and the second branch. Such a converter, for example, may be made by means of a boost converter, known in itself;
- a second power sensor 509 connected between said first connection branch and said second terminals, and adapted to detect second power values related to the input power to said first connection branch;
- a second microcontroller 510 connected to the second booster converter 516, to the second power sensor 509 and to the control unit 511 and configured to control the second booster converter 516.

According to an embodiment, the control unit 511 controls the second converter 518 by means of the second microcontroller 510 to draw electricity from the accumulator 502 and supply it to the inverter 504, if the power flowing between the grid 508 and the user arrangement 520 is higher (thus the user 506 is drawing power from the public grid) than a predetermined value (e.g. is higher than a threshold set to +50 Watt) and the stored residual charge value indicates that the accumulator 502 may supply power. In particular, the second microcontroller 510 controls the second booster converter 516 according to detection of the power flowing between the grid 508 and the user arrangement 520 and the stored residual charge value, both received by the control unit 511, and on the basis of second power values entering the booster converter 516 detected by means of second power sensor 509.

In dual mode with respect to the above-described reducer converter 515, the booster converter 516 boosts the output voltage as a function of the duty cycle. In particular, in the case of a boost converter, the output voltage increases as the duty cycle increases. So, by controlling the switching frequency of the switch of the booster converter 516, a given boosted output voltage is obtained with respect to the input voltage and a given power value is obtained as an input to the booster converter 516, detected by the second power sensor 509. According to preferred embodiment, the control of the booster converter 516 is based on its input power, i.e. on the power directly drawn from the accumulator 502. Such a positioning of the sensor 509 (as shown in FIG. 5, the seconds 509 and 514 are connected directly to the accumulator 502), which is unusual and may be considered "abnormal" has been found to be particularly advantageous; indeed, the inverter 504 which is provided with MPPT function and thus the voltage and current at its input are subject to continuous minor, rapid variations which would disturb the detections of a possible power sensor arranged at its input and the consequent control of the booster converter 516; instead, the delivery of power to the booster 516 is much more stable and can be controlled according to the general logic obtained by virtue of the sensor 507 and not influenced by the variations caused by the MPPT.

For example, the detection means 507 indicate a power draw value by the user 506 from the electric grid 508 of 200 Watt. The stored charge value indicates an availability of stored charge to supply the drawn 200 Watt. The second microcontroller 510 sets the duty cycle of the booster increasing until the second power values detected by the second power sensor 509 indicate an input power of the booster equal to 200 Watt. The 200 Watts of power are thus supplied by exploiting the accumulator 502.

The unit 511 periodically receives the detections carried out by the means 507, related to the power flowing between the user arrangement 520 and the grid 508 or vice versa. Thereby, it is determined whether the user's consumptions are coherent with the power drawn by the accumulator 502 by means of the booster converter. Therefore, if consumptions vary, the second microcontroller 510 will set a new duty cycle as a function of the latest detections carried out by the means 507.

Naturally, other types of control of the power drawn from the accumulator 502 cannot be excluded. For example, it is apparent that, at least in principle, the control could be carried out at the booster converter output.

Various particular cases may occur with respect to that described. In particular, it is worth investigating the case in which the user's consumptions are higher than the generation value of the photovoltaic panel. In this case, if the accumulator has stored power, this is supplied to the user in the above-described manner. However, the additional power supplied by the accumulator could not be sufficient to satisfy the user's consumptions, and in this case the user will draw power also from the grid. The power is thus supplied to the user by the photovoltaic panel, the accumulator and the public electric grid. Thereby, the power drawn from the grid in the moments of peak consumptions is advantageously reduced to the fraction of power which cannot be supplied by the photovoltaic panel/accumulator combination only.

According to an embodiment of the module 503, a control of the input power to the inverter 504 can be included to prevent dangerous overloads. To this end, the module 503 comprises a power detector 517 connected between the photovoltaic panel 501 and the inverter 504 and adapted to detect the power generated by the power panel. Such a detector is further connected to the control unit 511 to supply the performed detection. If such a detection indicates that the power entering the inverter is too high with respect to the maximum permitted value, the control unit 511 controls a reduction of the power coming from the booster 518. Such a detection also allows to avoid abnormal attempts of drawing more power from the panel than needed which could occur if the control were based only on the detection made by the power detector 507.

Figure 6:
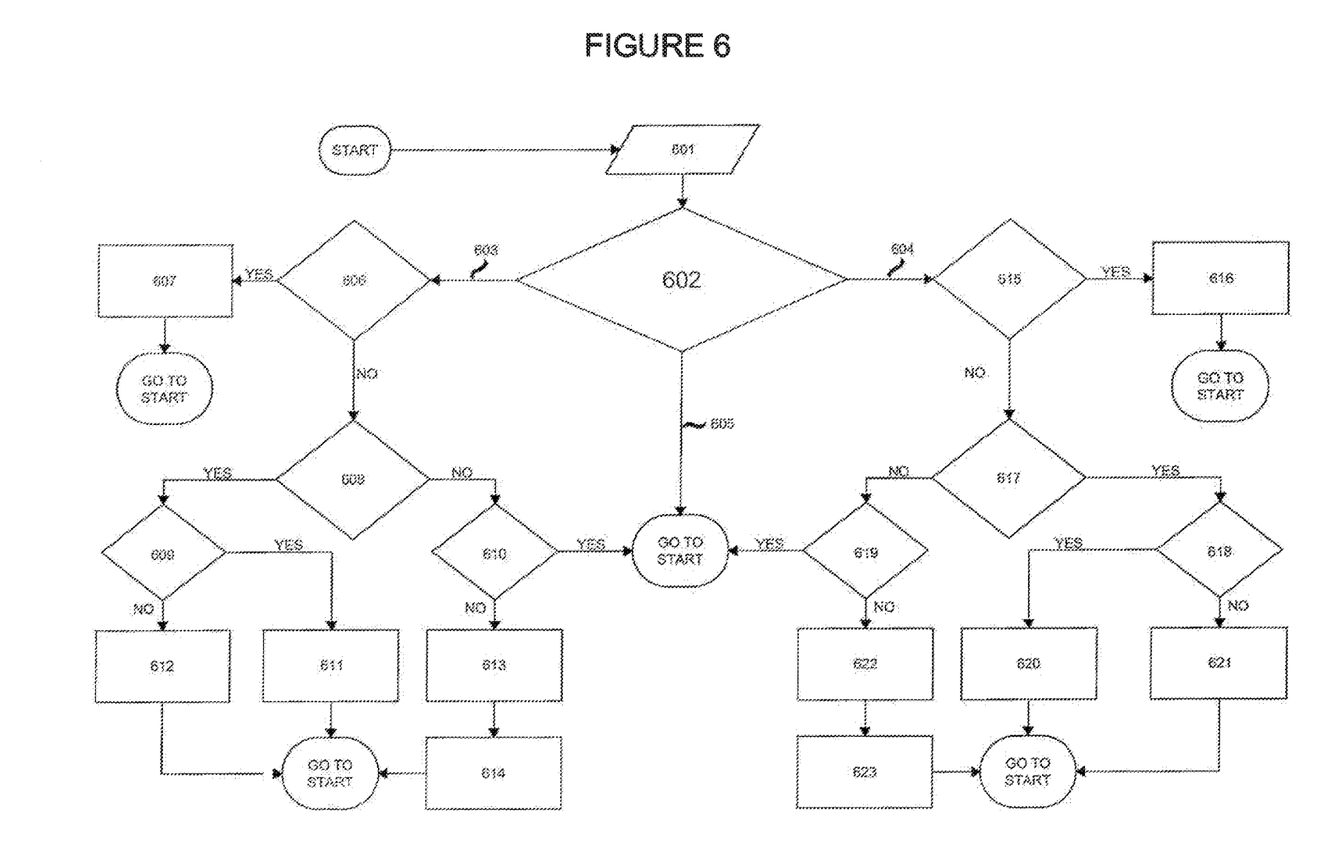
FIG. 6 shows a flow chart related to a possible operation of the photovoltaic system equipped with a module according to the present invention.

FIG. 6 shows a flow chart related to a possible operation of a photovoltaic system equipped with a module according to the present invention.

The sensor 407, 507 and the unit 511 cooperate to control the energy conditions of a user and of the respective photovoltaic panel. In particular, "energy conditions" mean the following situations: the photovoltaic panel generates power in excess with respect to the user's consumptions, the photovoltaic panel generates less power than the user's consumptions, the photovoltaic panel generates an amount of power which is substantially equal to user's consumptions. Appropriate actions are undertaken (if possible) when these conditions occur. Such actions are aimed at increasing the independence of the user from the public electric grid as much as possible. In particular, in the first case, the power in excess is stored, while in the second case the user is supplied with the stored power.

The beginning of the operations is indicated by the Start box; the first performed action is represented by block 601, in which the control unit 511 reads the detections carried out by the means 507. In test block 602, following reading block 601, the control unit 511 checks the power value detected by such means.

The installation configuration of the means 507 allows to detect a power value which, when appropriately interpreted, indicates whether the power flows from the user arrangement 420, 520 to grid 508 or vice versa. In particular, it is established in advance that a positive power indicates a flow going from the user arrangement to the public grid, while on the contrary, a negative power indicates a flow going from the public grid to the user arrangement.

Thus, if such a value is positive and higher than a given threshold value, hereinafter named step, (e.g. such a step set to ±50 Watt), such a detection indicates a transfer of power to the grid 508. Thus, the photovoltaic panel 501 is generating power in excess with respect to the consumptions of the user 506, and is transferring electricity to the grid. Such an alternative is represented by branch 604 at the output of test block 602.

Instead, if such a value is comprised within a given range determined by the negative value and by the positive value of the step (e.g., 50 Watt or less are transferred to the grid, thus the control is within a range of ±50 Watt), the photovoltaic panel 501 is generating a power substantially balanced with respect to the consumptions of the user 506. Such an alternative is represented by the branch 605 at the output of the test block 602.

If such a value is negative and lower than step (e.g., lower than −50 Watt), the detection indicates a power draw from the grid 508, i.e. the user 506 is drawing power from the grid 508. Such an alternative is represented by the branch 603 at the output of test block 602.

The step value is chosen during the step of programming of the unit 511 and represents a system parameter by means of which it is determined whether to activate the reducer, the booster or neither. The step value is also used as solution value to control the booster and the reducer, as will be more apparent below. Furthermore, many devices and household appliances of the user 506 have a consumption curve constituted by many peaks of short duration which are repeated. Such a consumption feature may imply continuous transitions from one energy condition (e.g., drawing from the grid) to another (e.g. storage of generated power). The step-based operating logic prevents these abnormal continuous transition situations, thus avoiding continuous activating and deactivating of the booster and of the reducer.

Branch 605 goes to the initial Start block; indeed, this situation is that of a balance between consumptions and generation, thus the unit 511 continues to read the detections of the means 507 to check that there is no deviation from such a situation. The reading frequency of such detections by such a unit 511 occurs with a given periodicity determined in advance during the step of programming of the module according to the present invention.

Branch 604 indicates a power transfer to the grid. Branch 604 goes to test block 615. In test block 615, the control checks whether the booster converter is active, i.e. whether the power transferred to the grid is supplied by drawing it from the accumulator 502. For example, this case could occur following a sudden drop of consumptions of the user 506, which were previously supplied by drawing power from the accumulator 502. In the positive case, indicated by the YES branch, the control reaches block 616. In block 616, the control unit 511 controls a power reduction of the booster converter by one step. From block 616, the control goes back to reading block 601/test block 602. Thus, the unit 511 checks whether the power reduction of the booster converter by one step was sufficient to no longer transfer power drawn from the accumulator 502 to the grid. The test and the processing carried out in blocks 615 and 616 are iterated until power drawn from the accumulator 502 ceases to be transferred to the grid, by deactivating the booster by one step at a time. In this condition, i.e. with the booster converter deactivated, block test 615 fails and the control, as indicated by the NO branch, reaches test block 617. In test block 617, the control checks whether the reducer converter is active, i.e. whether the accumulator 502 is already being charged. In the positive case, following the YES branch, the control reaches an addition test block 618, in which the unit 511 checks whether the stored residual charge value indicates that the accumulator 502 is fully charged. In the positive case, from test block 618, the control takes the YES branch and reaches block 620. Block 620 indicates that the unit 511, by means of the microcontroller 513, requests to switch off the reducer converter, because the accumulator cannot be charged further. The power generated by the photovoltaic panel is thus transferred to the grid.

After exiting block 620, the control goes back to the initial reading block 601.

If the result of test 618 is negative, the NO branch is followed and the block 621 is reached. In block 621, the unit 511, by means of the microcontroller 513, controls a power increase by one step at the reducer converter output (by operating on the duty cycle) to store more power in the accumulator 502. After exiting block 621, the control goes back to the initial reading block 601. The negative result of the test block 617 indicates that the reducer converter is active, so the accumulator is not being charged. In this case, via the NO branch at the output of test block 617, the control reaches test block 619, in which the unit 511 checks whether the stored residual charge value indicates that the accumulator 502 is fully charged. The positive case—represented by the YES branch exiting from the test block 619—indicates that no more power can be stored in the accumulator; the control thus goes back to the initial reading block 601.

The negative result of test block 619 indicates that power can be stored in the accumulator 502. The control thus follows the NO branch at the output of block 619 to reach block 622. Block 622 indicates that the unit 511, by means of the microcontroller 513, requests to switch on the reducer converter. From block 623, the control reaches block 623 where the unit 511 increases by means of the microcontroller 513 by one step from the power exiting from the reducer converter. After exiting block 623, the control goes back to the initial reading block 601.

If test block 602 (following reading block 601) indicates that the detected power is negative and lower than the step, the situation is that in which power is being drawn from the grid 508.

Such an alternative is represented by branch 603 at the output of test block 602. In practice, the user 506 is drawing power from the grid. The subsequent test 606, at the output of test 602, checks whether the reducer converter is active, i.e. whether the accumulator is being charged with the power drawn from the electric grid. In the positive case, following the YES branch at the output of block 606, the control reaches block 607. In block 607, the unit 511, by means of the microcontroller 513, controls a power reduction by one step of the reducer converter 515. After exiting block 607, the control goes back to the initial reading block 601. The negative result of the test 606, indicates that the reducer converter 515 is not active. So the user is drawing power from the electric grid to cope with consumptions. The NO branch at the output of test block 606 (reducer 515 not active) goes to the further test block 608. Test block 608 checks that the booster converter is already active. In practice, the control checks whether the power drawn by the accumulator 502 is being supplied to the user 506.

The NO branch indicates that the booster converter is already active and leads to the subsequent test block 610. In test block 610 the control method checks whether the stored residual charge value indicates that the accumulator 502 is charged. If the accumulator has stored power, it is supplied drawn from here. In the positive case, the YES branch at the outlet of block 613, reaches block 613 in which the unit 511, by means of the microcontroller 510, activates the booster converter 516. In block 614 at the output of block 613, the microcontroller 510 sets the switching frequency of the booster converter 516 according to second power values (entering the booster converter) of the power detections carried out by the means 507 and of the value of residual charge of the accumulator 502. After exiting block 614, the control goes back to the initial reading block 601.

Going back to test block 608 (in which the control checks whether the booster converter is already active) in the positive case the YES branch is followed to reach the subsequent test block 609. In this condition, power is already being supplied to the user 506 drawing it from the accumulator 502. In test block 609, the control method checks whether the stored residual charge value indicates that the accumulator 502 is charged. In the positive case, more power is supplied to the user 506 drawing it from the accumulator. Thus, by following the YES branch at the outlet from block 609, the control reaches block 611, in which the unit 511 by means of microcontroller 510 controls a power increase of the booster converter by one step. After exiting block 611, the control goes back to the initial reading block 601.

In the negative case, as indicated by the NO branch at the outlet of block 609, the control reaches block 612. If there is no availability of power in the accumulator 502, thus the unit 511, by means of the microcontroller 510, requires to switch off the booster converter. After exiting block 612, the control goes back to the initial reading block 601. It is worth noting that the availability of power in the accumulator 502 is determined during the step of configuring of the module according to the present invention and depends on the installed accumulator type. Thus, according to an embodiment, the unit 511 is configured so as to consider the charge of the accumulator 502 until it contains a percentage—with respect its total capacity—of stored charge. The stored charge value may be detected according to the above-described methods. The stored charge percentages set in unit 511 may thus be modified as a function of the adopted accumulator.

Figure 7:
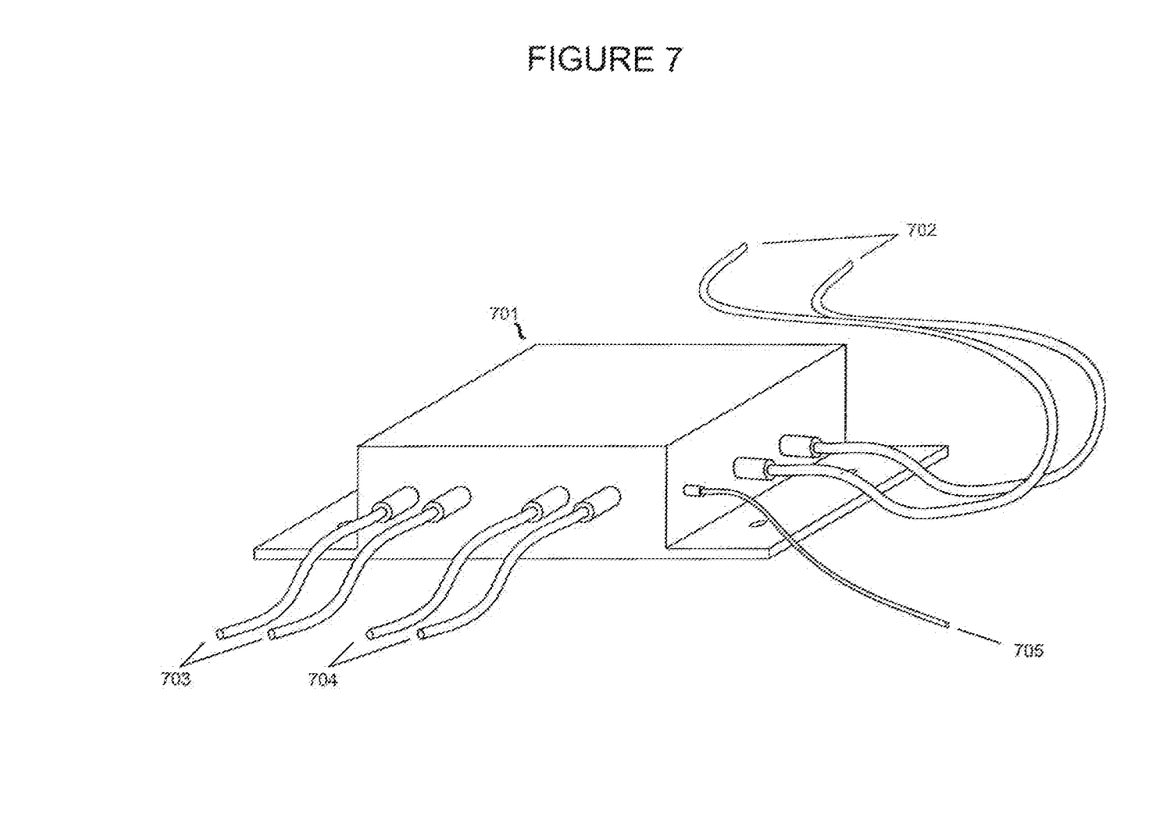
FIG. 7 shows an embodiment of a containing member for a module according to the present invention.

FIG. 7 shows a containing member 701 adapted to house the conversion unit 403, 503. According to a preferred embodiment, such a member 701 comprises:

first connectors 702 for connecting the conversion unit 403, 503 to the accumulator 402, 502;

second connectors 703 for connecting the conversion unit 403, 503 to the photovoltaic panel 401, 501;

third connectors 704 for connecting the conversion unit 403, 503 to the inverter 404, 504;

fourth connectors 705 for connecting the conversion unit 403, 503 to the power detector means 507.

Thereby, the installer of a module according to the present invention advantageously mounts the containing member 701 (e.g., by fixing it to a structure) and establishes the electrical connections. Thus, in this very simple, fast manner, the module according to the present invention is ready for use. Unit 511 is preferably programmed by means of a firmware, charged and run on specific means of the unit itself. In such a firmware, the main parameters (the steps, the reading frequency of the detections of the means 507 etc.) are set to default values so as to satisfy the widest range of needs possible. However, during the step of running of a photovoltaic system provided with a module according to the present invention, these default values may be suboptimal with respect to the features of the system and the consumptions of the user. To this end, the unit 511 may include an interface adapted to establish a communication channel with the interface device. For example, a USB or Bluetooth interface.

By means of such an interface device, provided with a USB or Bluetooth interface, in turn, the installer may set the value of the main parameters to make the module according to the present invention as optimal as possible for the system for which it is intended.

The present invention further relates to a photovoltaic system of the type connected to a public electric grid 408, 508 and to a user 406, 405, such a system comprising:

at least one photovoltaic panel 401, 501 adapted to be exposed to solar radiation to receive solar energy, comprising an electric output and adapted to generate direct current electricity from said solar energy;

a network inverter 404, 504 comprising an electric inverter input connected to the electric output of the photovoltaic panel 401, 501 and an electric inverter output, such an inverter 404, 504 being adapted to convert the direct current electricity (generated by the photovoltaic panel) into alternating electricity and making it available by means of the electric inverter output;

wherein an electricity accumulator 402, 502 is included to store the electricity generated by the photovoltaic panel 401, 501;

wherein the public electric grid 408, 508 and the user 406, 506 are connected electrically in parallel to the electric inverter output by means of a grid interface 405, 505;

such a system is characterized in that it comprises a module for storing/drawing electricity in/from said electric accumulator 402, of the previous described type. A further aspect of the present invention relates to a method for upgrading of a photovoltaic system, in particular for previously installed and running photovoltaic systems. Photovoltaic systems of the type connected to a public electric grid 408, 508 and to a user 406 (known in the field as grid systems), such systems comprising at least one photovoltaic panel 401, provided with an electric output and adapted to generate direct current electricity, a grid inverter 404 comprising an electric inverter input connected to the electric output of said photovoltaic panel 401, 501 and an electric inverter output, said inverter 404, 504 being adapted to convert said direct current electricity into alternating electricity and making it available to the user by means of the electric inverter output to the public electric grid 408, 508 and to the user 406, the method being characterized by the steps of: A—providing an electric accumulator 402, 502 adapted to store direct current electricity generated by the photovoltaic panel 401, 501;

B—providing a conversion unit 403, 503 comprising a two-way DC/DC converter 450, 550 and a control unit 511 connected to the two-way DC/DC converter 450, 550 and adapted to control it;

C—connecting the conversion unit 403, 503 to the inverter 404, 504 and to the photovoltaic panel 401, 501;

D—connecting the conversion unit to the accumulator 402, 502;

E—providing power detector means 507;

F—connecting the power detector means 507 to the electric interface 405, 505 at the output of said user 506 to the input of the public electric grid line 408, 508 and to the control unit 511.

The invention claimed is:

1. A module for storing/drawing electricity in/from an electric accumulator, said module comprising first terminals and second terminals, wherein said first terminals are adapted to be connected to a photovoltaic panel and an inverter, and said second terminals are adapted to be connected to said electric accumulator, said module comprising a conversion unit adapted to be connected between said first terminals and said second terminals, said conversion unit comprising, in turn, a two-way DC/DC converter adapted to convert a first energy flow generated by said photovoltaic panel to store it in said electric accumulator and a second energy flow taken from said electric accumulator to supply it to said inverter, wherein said two-way DC/DC converter is configured to convert said first energy flow and said second energy flow in a selective manner;

wherein the module comprises:
a power detector adapted to be connected between a user arrangement, which comprises said inverter, with MPPT, and a user, and a public electric grid, and adapted to detect power which flows between said user arrangement and said public electric grid, and vice versa between said public electric grid and said user arrangement;

wherein said conversion unit comprises a control unit connected to said power detector, and adapted to control said two-way DC/DC converter as a function of signals generated by said power detector, wherein said two-way DC/DC converter comprises:
a voltage reducer comprising a reducer input connected to said first terminals and a reducer output connected to said second terminals, said reducer being adapted to reduce the voltage between said reducer input and said reducer output;
a voltage booster comprising a booster input connected to said second terminals and a booster output connected to said first terminals, said voltage booster being adapted to boost the voltage between said booster input and said booster output;

wherein said control unit is connected to said voltage reducer and to said voltage booster and is configured to control them, and wherein said voltage reducer comprises:
a first switching reducer converter comprising a first connection branch connected to said first terminals and a second connection branch connected to said second terminals, and adapted to reduce the voltage between said first connection branch and said second connection branch;
a first power sensor connected between said second connection branch and said second terminals and adapted to detect first power values related to the power exiting from said second connection branch;
a first microcontroller connected to said first switching reducer converter, to said first power sensor and to said control unit and configured to control said first switching reducer converter.

2. The module of claim 1, comprising further first power detector adapted to be connected downstream of said photovoltaic panel, and adapted to detect the power generated by said photovoltaic panel and which flows towards said inverter; wherein said control unit is also adapted to control said two-way DC/DC converter as a function of signals generated by said further first power detector.

3. The module of claim 1, comprising further second power detector adapted to be connected between said two-way DC/DC converter and said electric accumulator, and adapted to detect the power in and out of said accumulator;

wherein said two-way DC/DC converter is internally controlled as a function of signals generated by said further second power detector.

4. The module of claim 1, comprising charge sensor adapted to detect a value of residual charge accumulated in said accumulator.

5. The module of claim 1, comprising charge sensor adapted to detect the value of residual charge accumulated in said accumulator, and wherein said control unit is further connected to said power detector and to said charge sensor device or devices, and is configured to activate said voltage reducer and said voltage booster in a selective manner on the basis of:
the power flowing either between said user arrangement and said electric power grid, or between said electric power grid and said user arrangement, and
the value of residual charge of said accumulator.

6. The module according to claim 5, wherein said control unit is configured:
i—to activate said voltage reducer if said power flowing between said user assembly and said public electric grid is higher than a predetermined value, and said residual charge value indicates an availability of said accumulator to store further power;
ii—to activate said voltage booster if said power flowing between said public electric grid and said user arrangement is higher than a predetermined value and said residual charge value indicates an availability which can be supplied by said accumulator.

7. The module according to claim 1, wherein said first microcontroller is configured to control the duty cycle of said first switching reducer converter on the basis of: said first power values, the power flowing either between said user arrangement and said public electric grid or between said public electric grid and said user arrangement, and the value of residual charge of said accumulator.

8. The module according to claim 1, wherein said voltage booster comprises:
a second switching booster converter comprising a first connection branch connected to said second terminals and a second connection branch connected to said first terminals, and adapted to boost the voltage between said first branch and said second branch;
a second power sensor connected between said first connection branch and said second terminals and adapted to detect second power values related to the power entering said first connection branch;
a second microcontroller connected to said second switching booster converter, said second power sensor and said control unit and configured to control said second switching booster converter.

9. The module according to claim 8, wherein said second microcontroller is configured to control the duty cycle of said second switching booster converter on the basis of: said second power values, the power flowing either between said user arrangement and said public electric grid or between said public electric grid and said user arrangement, and the value of residual charge of said accumulator.

10. The module of claim 1, wherein said conversion unit is housed in a containing member.

11. The module according to claim 10, wherein said containing member comprises:
first connectors for connecting said conversion unit to said accumulator;
second connectors for connecting said conversion unit to said photovoltaic panel;
third connectors for connecting said conversion unit to said inverter;
fourth connectors for connecting said conversion unit to said power detector.

12. A module for storing/drawing electricity in/from an electric accumulator, said module comprising first terminals and second terminals, wherein said first terminals are adapted to be connected to a photovoltaic panel and an inverter, and said second terminals are adapted to be connected to said electric accumulator, said module comprising a conversion unit adapted to be connected between said first terminals and said second terminals, said conversion unit comprising, in turn, a two-way DC/DC converter adapted to convert a first energy flow generated by said photovoltaic panel to store it in said electric accumulator and a second energy flow taken from said electric accumulator to supply it to said inverter, wherein said two-way DC/DC converter is configured to convert said first energy flow and said second energy flow in a selective manner;
wherein the module comprises:
a power detector adapted to be connected between a user arrangement, which comprises said inverter, with MPPT, and a user, and a public electric grid, and adapted to detect power which flows between said user arrangement and said public electric grid, and vice versa between said public electric grid and said user arrangement;
wherein said conversion unit comprises a control unit connected to said power detector, and adapted to control said two-way DC/DC converter as a function of signals generated by said power detector,
wherein said two-way DC/DC converter comprises:
a voltage reducer comprising a reducer input connected to said first terminals and a reducer output connected to said second terminals, said reducer being adapted to reduce the voltage between said reducer input and said reducer output;
a voltage booster comprising a booster input connected to said second terminals and a booster output connected to said first terminals, said voltage booster being adapted to boost the voltage between said booster input and said booster output;
wherein said control unit is connected to said voltage reducer and to said voltage booster and is configured to control them, and
wherein said voltage booster comprises:
a switching booster converter comprising a first connection branch connected to said second terminals and a second connection branch connected to said first terminals, and adapted to boost the voltage between said first branch and said second branch;
a power sensor connected between said first connection branch and said second terminals and adapted to detect second power values related to the power entering said first connection branch;
a microcontroller connected to said switching booster converter, said power sensor and said control unit and configured to control said switching booster converter.

13. The module according to claim 12, wherein said microcontroller is configured to control the duty cycle of said switching booster converter on the basis of: said second power values, the power flowing either between said user arrangement and said public electric grid or between said public electric grid and said user arrangement, and the value of residual charge of said accumulator.

14. The module of claim 12, comprising further first power detector adapted to be connected downstream of said photovoltaic panel, and adapted to detect the power generated by said photovoltaic panel and which flows towards said inverter; wherein said control unit is also adapted to control said two-way DC/DC converter as a function of signals generated by said further first power detector.

15. The module of claim 12, comprising further second power detector adapted to be connected between said two-way DC/DC converter and said electric accumulator, and adapted to detect the power in and out of said accumulator; wherein said two-way DC/DC converter is internally controlled as a function of signals generated by said further second power detector.

16. The module of claim 12, comprising charge sensor adapted to detect a value of residual charge accumulated in said accumulator.

17. The module of claim 12, comprising charge sensor adapted to detect the value of residual charge accumulated in said accumulator, and wherein said control unit is further connected to said power detector and to said charge sensor device or devices, and is configured to activate said voltage reducer and said voltage booster in a selective manner on the basis of:
- the power flowing either between said user arrangement and said electric power grid, or between said electric power grid and said user arrangement, and
- the value of residual charge of said accumulator.

18. The module according to claim 17, wherein said control unit is configured:
- i—to activate said voltage reducer if said power flowing between said user assembly and said public electric grid is higher than a predetermined value, and said residual charge value indicates an availability of said accumulator to store further power;
- ii—to activate said voltage booster if said power flowing between said public electric grid and said user arrangement is higher than a predetermined value and said residual charge value indicates an availability which can be supplied by said accumulator.

19. The module of claim 12, wherein said conversion unit is housed in a containing member.

20. The module according to claim 19, wherein said containing member comprises:
- first connectors for connecting said conversion unit to said accumulator;
- second connectors for connecting said conversion unit to said photovoltaic panel;
- third connectors for connecting said conversion unit to said inverter;
- fourth connectors for connecting said conversion unit to said power detector.

\* \* \* \* \*